United States Patent
Karstens et al.

(10) Patent No.: US 7,526,283 B2
(45) Date of Patent: *Apr. 28, 2009

(54) METHOD AND SYSTEM FOR SINGLE-STEP ENABLEMENT OF TELEPHONY FUNCTIONALITY FOR A PORTABLE COMPUTER SYSTEM

(75) Inventors: Rich Karstens, Lake Forest Park, WA (US); Ryan Robertson, Seattle, WA (US)

(73) Assignee: PalmSource, Inc., Sunnyvale, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 11/484,213

(22) Filed: Jul. 11, 2006

(65) Prior Publication Data

US 2006/0252465 A1 Nov. 9, 2006

Related U.S. Application Data

(63) Continuation of application No. 09/687,518, filed on Oct. 13, 2000, now Pat. No. 7,076,275.

(51) Int. Cl.
*H04M 3/00* (2006.01)

(52) U.S. Cl. ............... 455/418; 455/556.1; 455/567; 379/211.01; 715/700

(58) Field of Classification Search ............ 455/417, 455/418, 556.2, 556.1; 715/700; 379/211.01
See application file for complete search history.

(56) References Cited

U.S. PATENT DOCUMENTS

| | | | |
|---|---|---|---|
| 5,652,789 A * | 7/1997 | Miner et al. ........ | 379/201.01 |
| 5,671,267 A | 9/1997 | August et al. ........ | 455/420 |
| 5,797,089 A | 8/1998 | Nguyen ........ | 455/403 |
| 5,818,924 A | 10/1998 | King et al. ........ | 379/389 |
| 5,892,764 A | 4/1999 | Riemann et al. ........ | 370/401 |
| 5,898,432 A * | 4/1999 | Pinard ........ | 715/861 |
| 5,907,545 A | 5/1999 | Arai et al. ........ | 370/342 |
| 5,930,700 A | 7/1999 | Pepper et al. ........ | 455/414 |
| 6,201,863 B1 * | 3/2001 | Miloslavsky ........ | 379/242 |
| 6,230,029 B1 | 5/2001 | Hahn et al. ........ | 455/586 |
| 6,370,401 B1 | 4/2002 | Baranowski et al. ........ | 455/569.1 |
| 6,404,860 B1 | 6/2002 | Casellini ........ | 379/88.17 |
| 6,445,935 B1 | 9/2002 | Mitten et al. ........ | 455/567 |
| 6,516,202 B1 | 2/2003 | Hawkins et al. ........ | 455/556.1 |
| 6,529,742 B1 | 3/2003 | Yang ........ | 455/556.1 |
| 6,714,222 B1 | 3/2004 | Bjorn et al. ........ | 715/839 |
| 7,020,264 B1 * | 3/2006 | Neyman et al. ........ | 379/220.01 |
| 7,047,426 B1 * | 5/2006 | Andrews et al. ........ | 713/155 |
| 7,085,257 B1 * | 8/2006 | Karves et al. ........ | 370/352 |
| 2002/0067736 A1 * | 6/2002 | Garcia-Luna-Aceves et al. . | 370/442 |

FOREIGN PATENT DOCUMENTS

| | | |
|---|---|---|
| EP | 0 940 964 A1 | 8/1998 |
| WO | WO 00/05641 | 2/2000 |
| WO | WO 00/49731 | 8/2000 |

* cited by examiner

*Primary Examiner*—Danh C Le
(74) *Attorney, Agent, or Firm*—Berry & Associates P.C.

(57) ABSTRACT

A method and apparatus for automatic delivery of a phone call on an electronic device regardless of whether other tasks are running on the operating system. A separate background task ("thread"), independent of the operating system, enables telephony functionality without regard to the mode of a graphical user interface. The background task is always active and functions to respond to an incoming call even if the user is in a graphical user interface window that requires some input from the user (e.g. the graphical user interface is blocked).

16 Claims, 6 Drawing Sheets

METHOD AND SYSTEM FOR SINGLE-STEP ENABLEMENT OF TELEPHONY FUNCTIONALITY FOR A PORTABLE COMPUTER SYSTEM

CROSS REFERENCE TO RELATED APPLICATIONS

This application is a continuation application of application Ser. No. 09/687,518, entitled "METHOD AND SYSTEM FOR SINGLE-STEP ENABLEMENT OF TELEPHONY FUNCTIONALITY FOR A PORTABLE COMPUTER SYSTEM," filed Oct. 13, 2000, to be issued as U.S. Pat. No. 7,076,275, and assigned to the assignee of the present application. The subject matter in the above-identified and commonly owned application is incorporated herein by reference.

BACKGROUND OF THE INVENTION

1. Field of the Invention

The present invention relates to the field of portable electronic devices such as personal digital assistants or palmtop computer systems. Specifically, the present invention relates to a method and system for allowing a background task to run on a portable electronic device facilitating telephony functionality on the portable electronic device.

2. Related Art

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

The emergence of the cellular phone technology in the last few years has revolutionized the telecommunications industry. Where in the past telephones were largely confined to homes, offices, and other stationary structures, cellular phone technology has made it possible for phones to be—truly portable and exist nearly anywhere there are people.

Recently, the technology behind both palmtop computer systems and cellular phones has advanced to the point where it is proposed to integrate cellular phone capabilities into a palmtop computer system, while not increasing the size of the palmtop device. However, the operating systems that control some palmtop computer systems (for example, Palm computer systems) have not been designed especially with cellular phone technology in mind. As a result, difficulty arises for answering incoming calls when palmtop devices are in certain modes.

Referring to FIG. 1, one prior art process 100 for answering an incoming phone call on a telephony enabled palmtop computer system is shown. In step 105, an incoming phone call is received by the operating system. The operating system then determines in step 110 whether or not the graphical user interface is busy, e.g. waiting for information from a user. In the event that the graphical user interface is not busy, the incoming phone call interrupt activates causing the device to ring (step 115) and the user may answer the phone call (step 120). However, when the graphical user interface is busy, the incoming call may become ignored thereby preventing the phone call from being answered (step 125).

The graphical user interface of a palmtop computer systems is partially controlled by the operating system. While the operating system is classified as multitasking, all user interfacing is done under one "thread." As a result, on some occasions, an application may block the operating system from running any other applications. This occurs when the application at use requires a user input through a graphical user interface. In this case, the operating system will not run any other applications until the user has entered an input. The application at use may also block the operating system from running other applications if the application is not processing system events in a timely manner. It would be advantageous to provide an electronic device that is portable and integrates cellular phone technology with portable computer system technology and that facilitates telephony functions regardless of the software state of the portable computer system.

SUMMARY OF THE INVENTION

Accordingly, what is needed is a method and/or system that enables the user of a device, such as a palmtop computer system or a PDA, to answer incoming phone calls using the device even when a graphical user interface of the device is awaiting a user input, and is therefore blocked. What is also needed is a method and/or system for notifying the user of an incoming call when the graphical user interface is blocked. In addition, what is needed is a method and/or system that can satisfy the above needs and that is user-friendly and convenient. The present invention provides these advantages and others not specifically mentioned above but described in the sections to follow.

A method and system are described for automatic delivery of a phone call on a palmtop device (e.g. a palmtop computer system or a PDA) regardless of whether other tasks are running on the operating system. Embodiments include a separate background task ("thread") interfacing directly with the telephony functionality of the palmtop device to enable telephony functionality regardless of the state of the graphical user interface. In one embodiment, the background task, which runs under the operating system, is always active and functions to monitor an interrupt line and controls the serial port connected to a phone chipset/module. The background task responds to an incoming call even if the user is in a graphical user interface window that requires some input from the user (e.g. the user interface is blocked), and the task alerts the user of the incoming phone call. Therefore, calls can be answered using the device regardless of the state of the graphical user interface. The background task also senses any of the palmtop device's telephony buttons and controls any ringer, vibrator or LEDs of the device's hardware, as well as any buttons located on a headset or earpiece connected to the device.

One embodiment is relevant when the graphical user interface is not blocked and one or more phone related displays can automatically be displayed on the device's screen. The phone related displays are similar to those displayed on cellular phones. The background task monitors for and receives incoming phone calls, interfaces with the graphical user interface to display any call information on the device's screen, alerts the user as to the incoming call (via any ringer, vibrator and/or LEDs), and permits the user to answer the phone via a button on the palmtop device itself or a button on any earpiece or headset the user is operating.

Another embodiment is relevant when the graphical user interface is blocked but the user can still answer the phone despite no phone related displays appearing on the device's screen. This allows a user to be alerted to an incoming phone call (via any ringer, vibrator and/or LEDs) and to answer the phone via a button on the device itself or a button on any earpiece or headset the user is operating, without requiring the use of the device's LCD screen or the screen digitizer.

In accordance with the present embodiment of the present invention, the telephony functionality is automatically implemented in the background transparent to the user, and thus is convenient and user-friendly. In addition, the user is notified of an incoming phone call even when the graphical user interface is blocked, therefore greatly enhancing the usefulness and commercial practicability of palmtop computer system with telephony functionality.

DETAILED DESCRIPTION OF THE INVENTION

Figure 1:
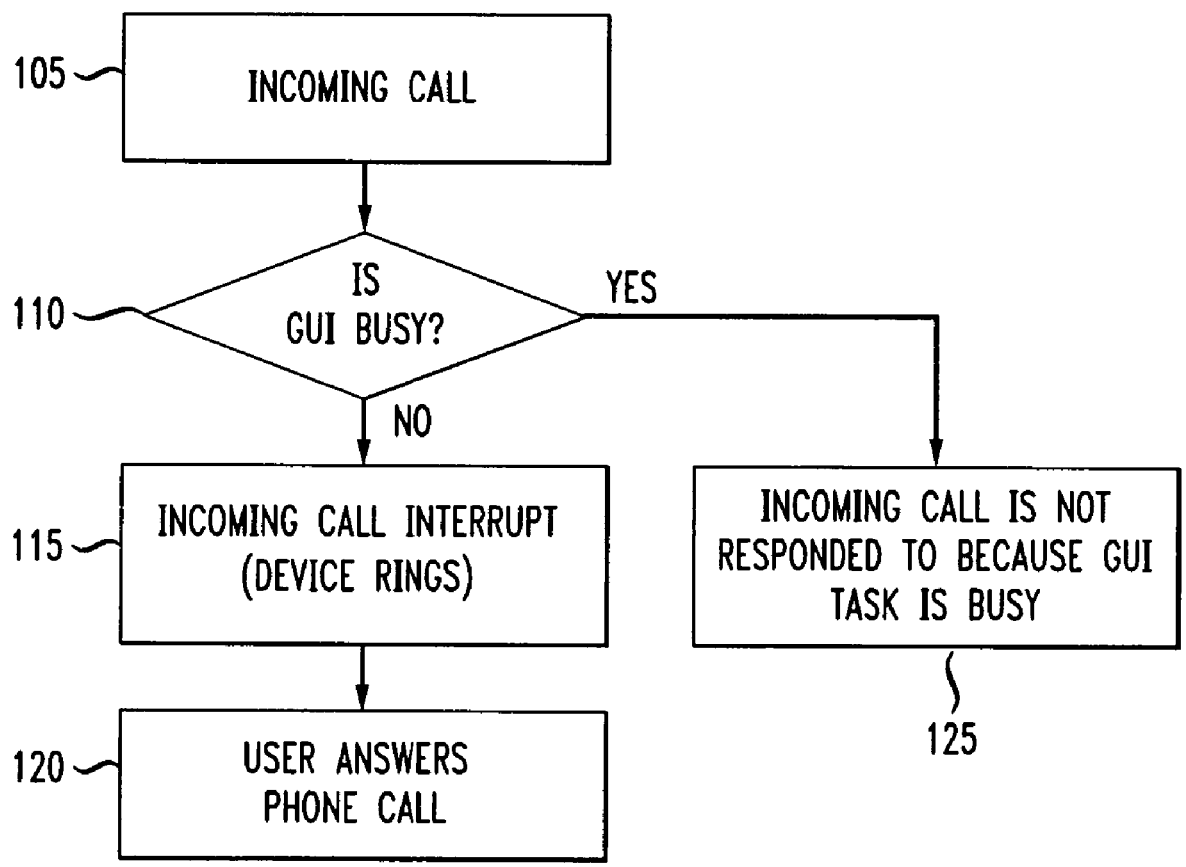
FIG. 1 is a flowchart showing the steps of a process for answering an incoming call on a telephony enabled palmtop computer system in accordance with the prior art.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "monitoring" or "notifying" or "interfacing" or "receiving" or "answering" or the like, refer to the action and processes of a computer system (e.g., process 500 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable computer system, such as a palmtop or personal digital assistant, with telephony functionality, allowing the portable computer system to act as a cellular phone. However, it is appreciated that the present invention can be used with other types of devices that have the capability to access some type of central device or central site, including but not limited to laptop computer systems.

Exemplary Portable Computer System Platform

Figure 2:
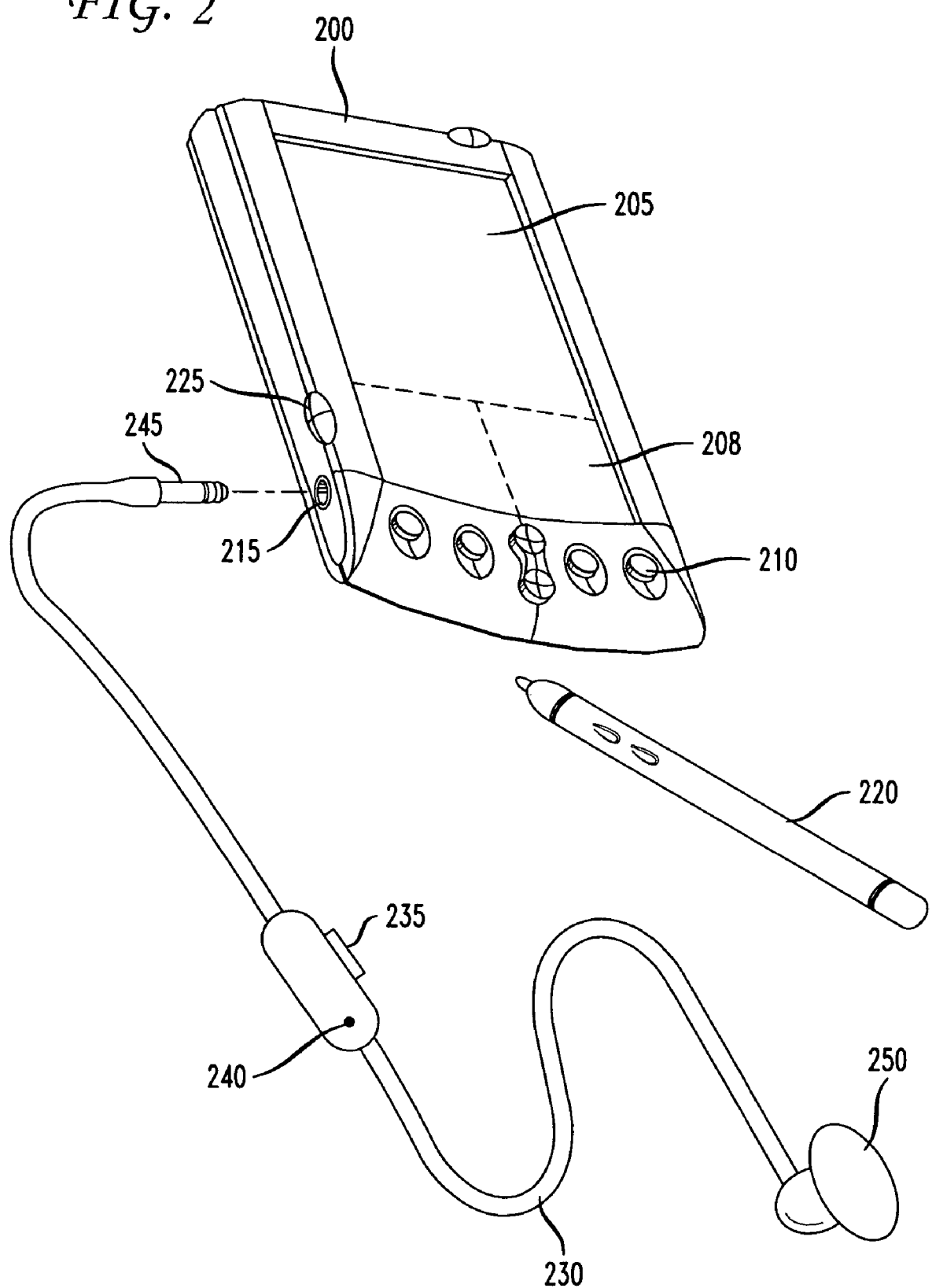
FIG. 2 is a top side perspective view of a portable computer system and an earbud piece in accordance with one embodiment of the present invention.

FIG. 2 is a perspective illustration of a portable computer system 200 and an earbud piece 230 in accordance with one embodiment of the present invention. The portable computer system 200 is implemented with telephony functionality and also contains a display screen 205. A stylus 220 is also shown. The stylus 220 can be stored in a slot located in portable computer system 200. The display screen 205 contains digitized regions 208 and is a touch screen able to register contact between the screen 205 and the tip of the stylus 220. The stylus 220 can be made of any material to make contact with the screen 205. The portable computer system 200 also contains one or more dedicated and/or programmable buttons 210 for selecting information and causing the computer system to implement functions. The portable computer system 200 also may contain at least one earbud/headset jack 215 for connecting a listening/answering device to the portable computer system 200. The on/off button 225 is also shown.

FIG. 2 also illustrates an exemplary earbud 230 in accordance with one embodiment of the present invention. The earbud 230 is able to connect with the portable computer system 200 by inserting the plug 245 into the earbud/headset jack 215. The earbud 230 also comprises one or more programmable buttons 235. In one embodiment, programmable button 235 is used to answer or disconnect a phone call. The earbud 230 also comprises a microphone 240 and an earpiece 250.

In one embodiment of the present invention, the earbud 230 and/or the microphone 240 may be replaced with a headset. In another embodiment of the present invention, the earbud 230 may be replaced with a wireless earbud or headset.

Figure 3:
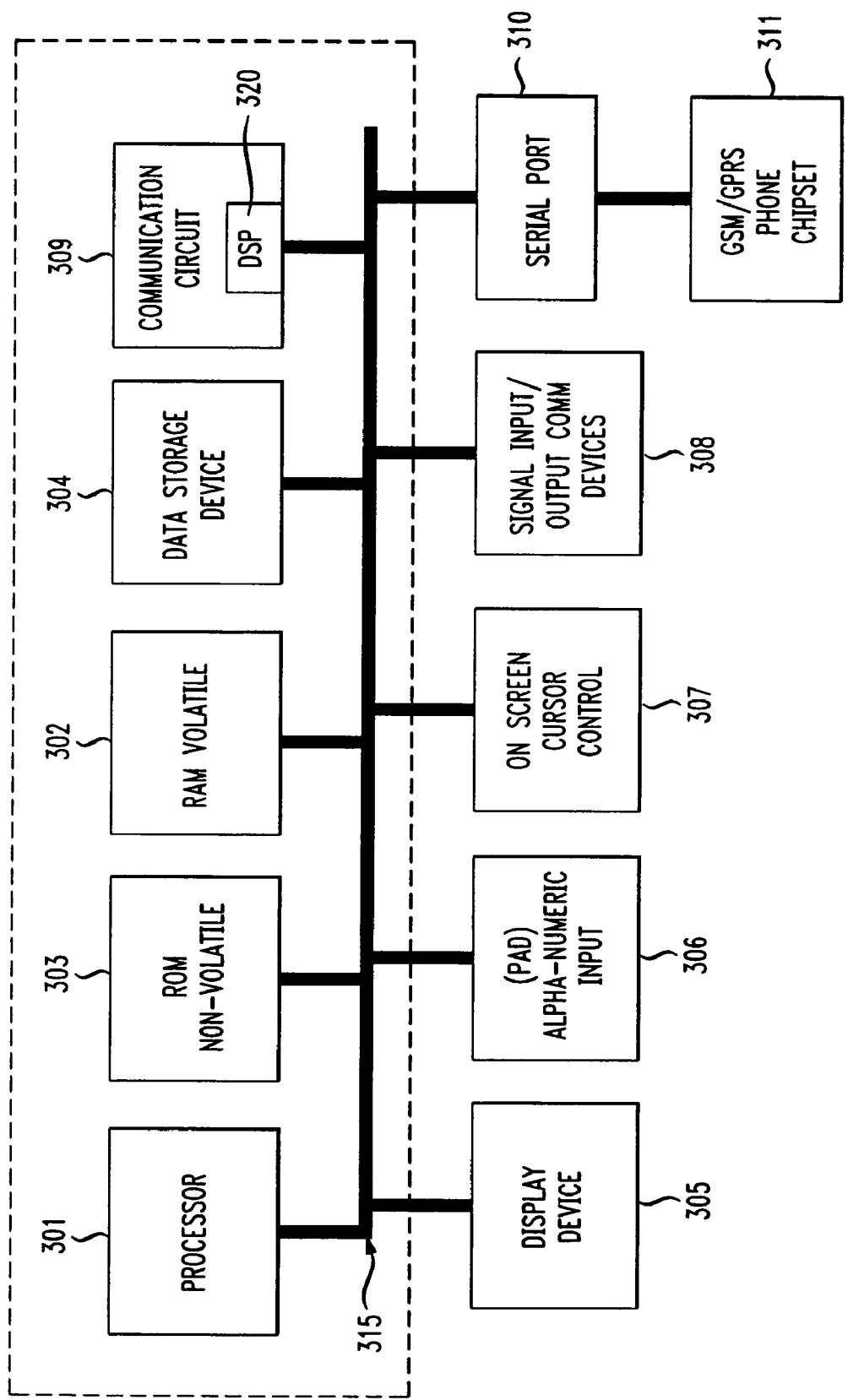
FIG. 3 is a block diagram of one embodiment of a portable computer system in accordance with the present invention.

FIG. 3 illustrates circuitry of exemplary computer system 300, some of which can be implemented on a PC board located inside the portable computer system 200. Computer system 300 includes an address/data bus 315 for communicating information, a central processor 301 coupled with the bus for processing information and instructions, a volatile memory 302 (e.g., random access memory, RAM) coupled with the bus 315 for storing information and instructions for the central processor 301 and a non-volatile memory 303 (e.g., read only memory, ROM) coupled with the bus 315 for storing static information and instructions for the processor 301.

Computer system 300 also includes an optional data storage device 304 (e.g., memory stick) coupled with the bus 315 for storing information and instructions. Device 304 can be removable. As described above, computer system 300 also contains a display device 305 coupled to the bus 315 for displaying information to the computer user. The PC board can contain the processor 301, the bus 315, the ROM 303 and the RAM 302. Computer system 300 also includes a signal transmitter/receiver device 308, which is coupled to bus 315 for providing a physical communication link between computer system 300, and a network environment.

In one embodiment, computer system 300 includes a communication circuit 309 coupled to bus 315. Communication circuit 309 includes an optional digital signal processor (DSP) 320 for processing data to be transmitted or data that are received via signal transmitter/receiver device 308. Alternatively, processor 301 can perform some or all of the functions performed by DSP 320.

Also included in computer system 300 of FIG. 3 is an optional alphanumeric input device 306 that in one implementation is a handwriting recognition pad ("digitizer"). Alphanumeric input device 306 is a user interface device and can communicate information and command selections to processor 301. Computer system 300 also includes an optional cursor control or directing device (on-screen cursor control 307) coupled to bus 315 for communicating user input information and command selections to processor 301. In one implementation, on-screen cursor control device 307 is a user interface device and is a touch screen device incorporated with display device 305. On-screen cursor control device 307 is capable of registering a position on display device 305 where the stylus makes contact. The display device 305 utilized with computer system 300 may be a liquid crystal display device, a cathode ray tube (CRT), a field emission display device (also called a flat panel CRT) or other display device suitable for generating graphic images and alphanumeric characters recognizable to the user. In the preferred embodiment, display device 305 is a flat panel display, display screen 205 (FIG. 2).

With reference still to FIG. 3, computer system 300 also includes a serial port 310, which is coupled between bus 315 and GSMIGPRS telephony chipset 311, serving as an exemplary interface between the central processor 301 and the GSMIGPRS telephony chipset 31 1. Global System for Mobile Communications (GSM) and General Packet Radio Service (GPRS) are standards for wireless communications, and are common to the area of cellular communications. The GSMIGPRS telephony chipset 31 1 enables the computer system 300 to provide the functionality of a cellular phone. It should be appreciated that within the present embodiment, GSMIGPRS telephony chipset 31 1 provides the telephony functionality to transmit and receive cellular communications. It should be further appreciated that the present embodiment of GSMIGPRS telephony chipset 31 1 is well suited to be implemented in a wide variety of ways. For example, GSMIGPRS telephony chipset 311 could be implemented as a modem.

Figure 4A:
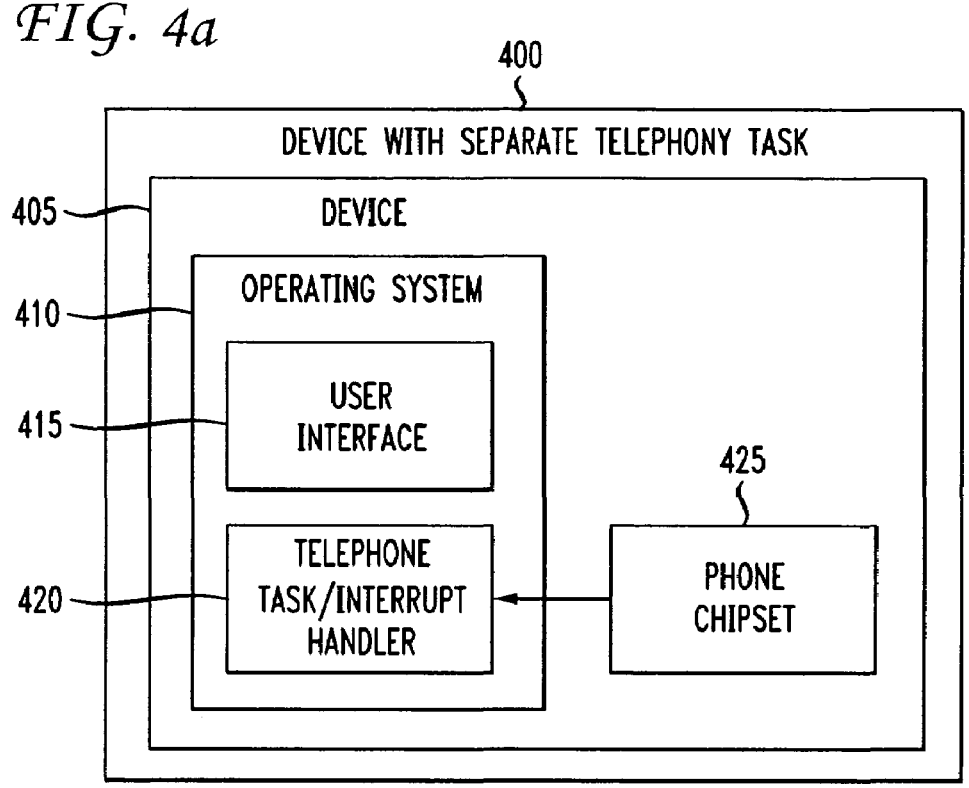
FIG. 4a is a software block diagram showing a device with a separate task to handle telephony functions.

Singe-step Enablement of Telephony Functionality for a Portable Computer System in Accordance with the Present Invention FIG. 4a is a block diagram 400, in accordance with one embodiment of the present invention, illustrating a device (e.g. a palmtop or portable computer system) having a separate background task that interfaces directly with the telephony functionality (e.g. a cellular phone) of the device. In one embodiment of the present invention, the device 405 contains at least two chipsets, an operating system chipset 410 and a phone chipset 425. Operating system chipset 410 operates to control a wide variety of applications of the device including the graphical user interface 415 and the telephony task 420.

In one embodiment of the present invention, phone chipset 425 receives incoming phone calls. The telephony task 420 monitors the phone chipset 425 for incoming calls. The telephony task 420 also controls any ringers, vibrators or LEDs functioning for notifying a user of an incoming phone call.

Upon receiving notice of an incoming phone call, in one embodiment of the present invention, the telephony task 420 will attempt to notify the operating system 410 of the incoming phone call, irrespective of whether the user interface is active (e.g. a user is using the device). At the time of the incoming phone call, the graphical user interface 415 may be busy (i.e. waiting for information from the user). If the graphical user interface 415 is busy, it may block any access by the telephony task 420 depending on how the modes are set that control this functionality.

Figure 4B:
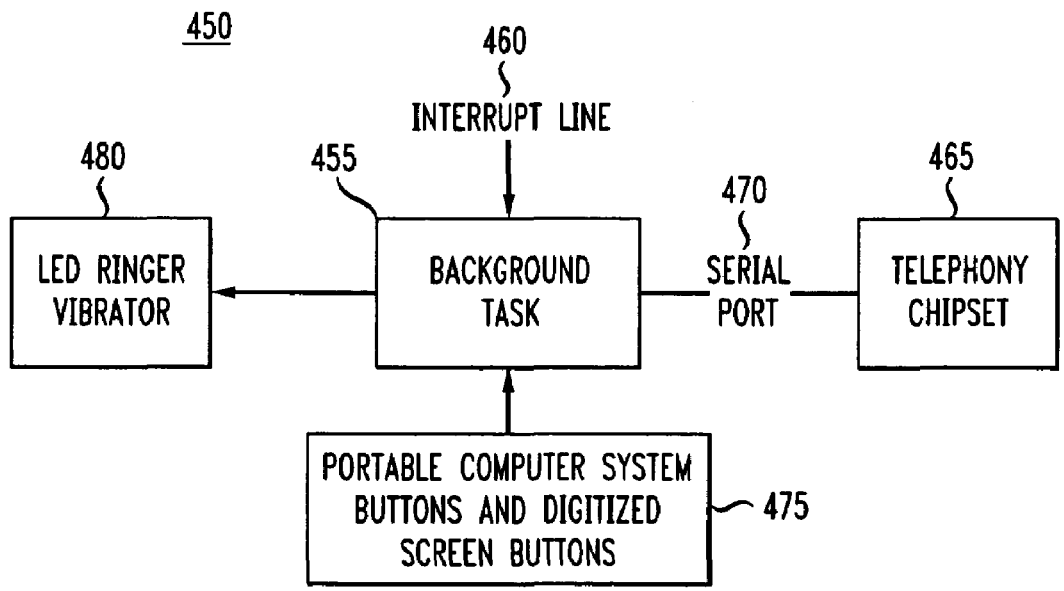
FIG. 4b is a software block diagram showing a device with a separate task to handle telephony functions in accordance with one embodiment of the present invention.

FIG. 4b is a software block diagram 450 showing a portable computer system with a separate task to handle telephony functions in accordance with one embodiment of the present invention. The background task 455 responds to the interrupt line 460, wherein the interrupt line 460 monitors for incoming phone calls. The background task 455 is also connected to the telephony chipset 465 through serial port 470. The background task 455 senses the system buttons and the graphical user interface of the portable computer system, and controls any LED, ringer or vibrator 480.

Figure 5:
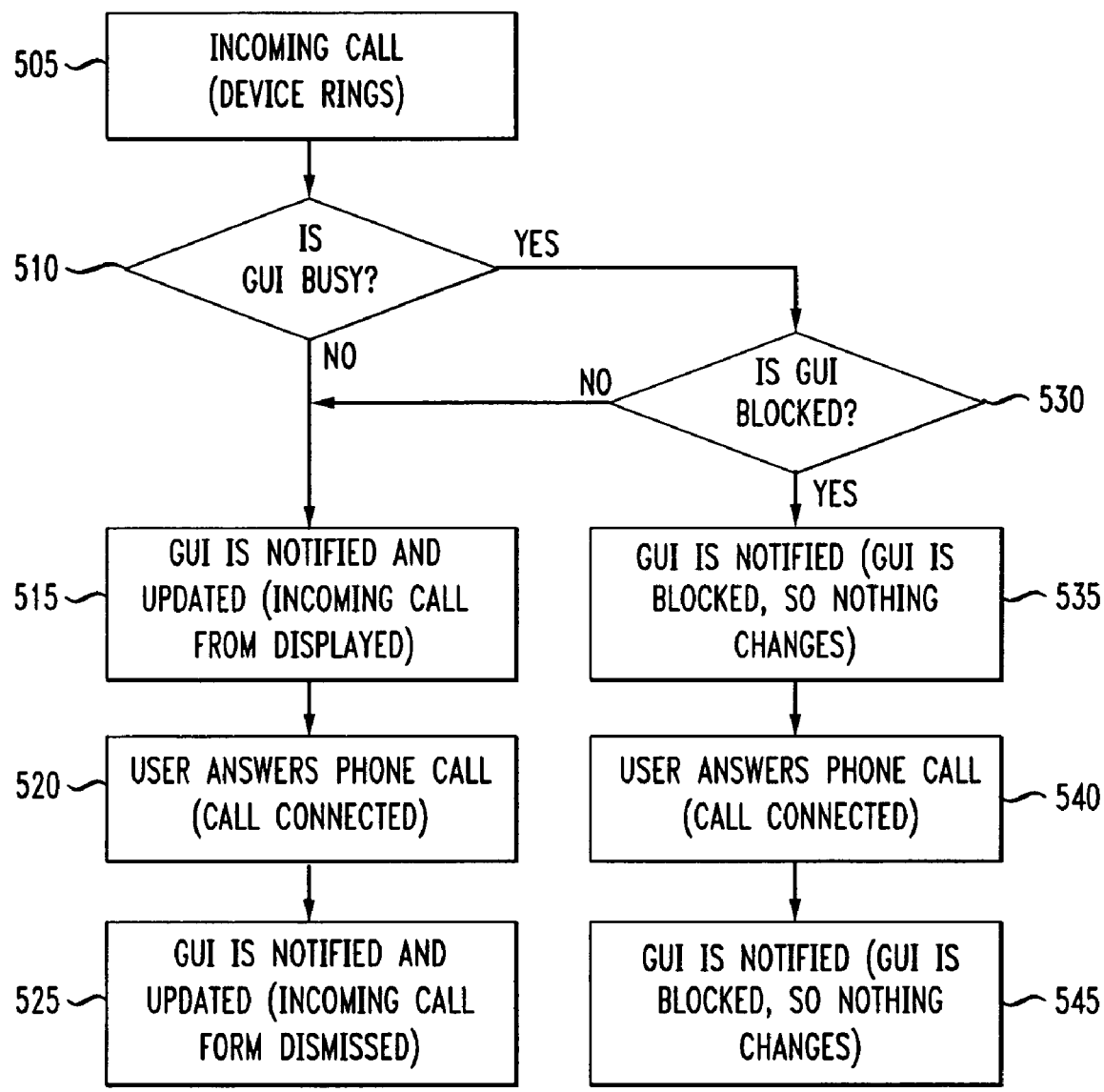
FIG. 5 is a flowchart showing steps of a process for answering an incoming call on a portable computer system running a background task in accordance with an embodiment of the present invention.

FIG. 5 is a flowchart showing the steps in a process 500 for notifying a device (e.g. a portable or palmtop computer system) with telephony functionality of an incoming phone call and for notifying and updating the device's graphical user interface in accordance with one embodiment of the present invention. Process 500 is an implementation of the present invention.

In Step 505 of process 500 an incoming call is received by the telephony task which then notifies the user of the incoming call irrespective of the user's activity on the device. The notification may be in the form of activating any ringer, vibrator, or LED hardware or software located within the device.

In step 510 of process 500 the telephony task attempts to notify and update the graphical user interface. As stated above, the graphical user interface may be busy, as it is waiting for user input. In the event that the graphical user interface is busy, as shown in step 530 of process 500, the graphical user interface still may not be blocked, depending on the application using the graphical user interface. If the graphical user interface is not blocked, then the application using the graphical user interface may receive notification of the incoming phone call.

In step 515 of process 500 the graphical user interface is either not busy or busy but not blocked. In this event, the graphical user interface is notified and updated. For example, an incoming call form containing information that an incoming call has been received is displayed on the device's screen.

The form may contain a wide variety of information including caller identification and various answering options.

Figure 6:
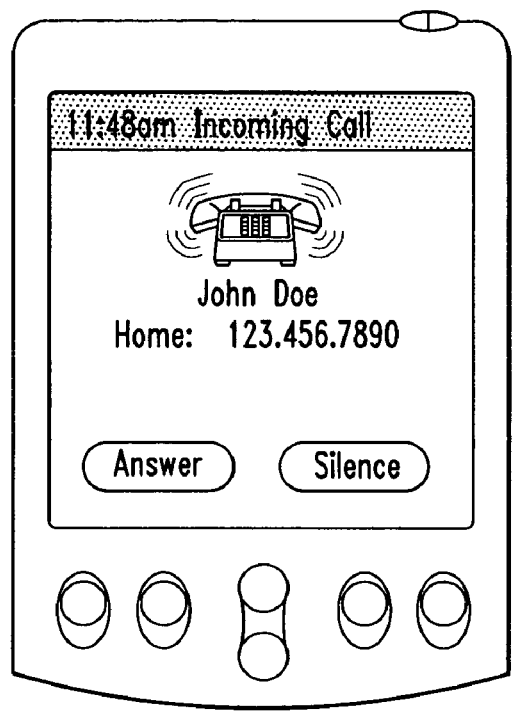
FIG. 6 illustrates an exemplary display of the caller information during an incoming telephone call in a portable computer system in accordance with one embodiment of the present invention.

FIG. 6 is an exemplary display 600 of the caller identification during an incoming call in accordance with one embodiment of the present invention. Screen 605 includes a title bar 610 that includes information about the application using the graphical user interface. In one embodiment of the present invention, caller identification information 615 is displayed on screen 605. Digitized buttons 620 allow for the user, with use of a stylus, to provide the operating system with the requested user inputs.

Figure 7:
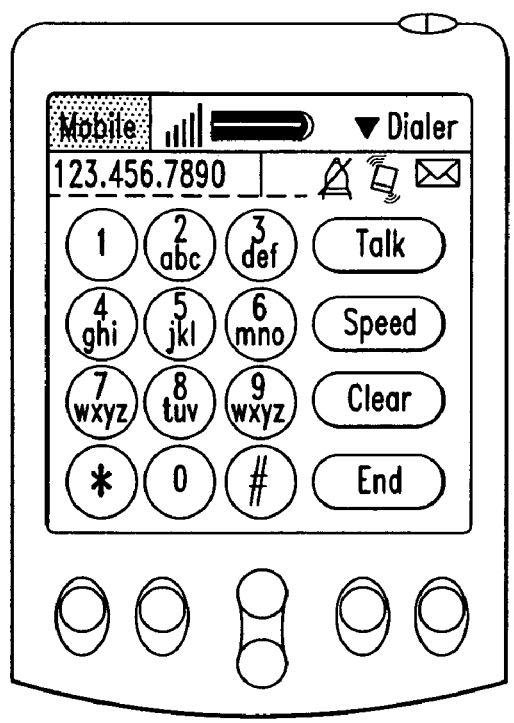
FIG. 7 illustrates an exemplary display of the phone dialer for the telephony functionality application in a portable computer system in accordance with one embodiment of the present invention.

For further exemplary purposes, FIG. 7 is an exemplary display 700 of the phone dialer for the telephony functionality application in a portable computer system. Screen 705 includes a title bar 710 that contains information about the application using the graphical user interface. Digitized telephone buttons 715 allow for the user, with use of a stylus, to enter in the phone number the user wishes to dial. Digitized buttons 720 are programmable to perform further telephony functions.

Returning to FIG. 5, in step 520 of process 500, the user answers the phone call. The device may offer users several different answering options, including an answering option on the graphical user interface, a button on the device itself, or a button on any headset or earbud coupled to the device. Once the phone call is connected, in step 525 of process 500, the graphical user interface is again notified and updated. In one embodiment the display may contain a message that the call has been answered. The display may also contain information such as the length of the call.

In the event that the graphical user interface is busy, as shown in step 530 of process 500, the graphical user interface may be also blocked, prohibiting the graphical user interface from receiving notification of the incoming phone call. In step 535 of process 500 the telephony task attempts to notify and update the graphical user interface, but is unable to as the graphical user interface is blocked. In this situation, the program currently occupying the graphical user interface is not affected, and the telephony task is blocked from access.

In step 540 of process 500, the user answers the phone call. The device may offer users several different answering options, including a button on the device itself or a button on any headset or earbud coupled to the device. It should be understood that even though the graphical user interface is blocked, the phone may still be answered.

In step 545 of process 500, the graphical user interface is again notified. However, as the graphical user interface is still blocked, the display is not updated.

In summary, in accordance with the present invention, when a device (e.g., a portable device such as portable computer system 100) with telephony functionality receives a phone call, the call can be answered by the user, regardless of whether other tasks are running on the operating system. A separate background task, independent of the user interface task, enables telephony functionality without requiring use of the graphical user interface. The background task monitors an interrupt line and controls the serial port connected to the phone chipset.

In accordance with the present embodiment of the present invention, telephony functionality is enabled in all situations, even where the graphical user interface is blocked. In addition, telephony functionality can be automatically implemented in the background without a user knowing it is occurring, and thus is convenient and user-friendly.

Thus, the present invention enables telephony functionality in a device such as a portable (palmtop) computer system, PDA, laptop or other types of device, even when the graphical user interface is blocked. In addition, the present invention provides a system and method that is user-friendly and convenient.

The preferred embodiment of the present invention, a method and system for automatic delivery of a phone call on a portable electronic device, is thus described. While the present invention has been described in particular embodiments, it should be appreciated that the present invention should not be construed as limited by such embodiments, but rather construed according to the below claims.

What is claimed is:

1. In a portable electronic device having an operating system, a method for automatically delivering a phone call, said method comprising the steps of:
   a) monitoring for incoming phone calls by a background task interfacing directly with the telephony functionality of said device, said background task always active, said device's operating system including at least one graphical user interface;
   b) detecting said incoming phone call by said background task;
   c) notifying said operating system of said incoming phone call by said background task; and
   d) said background task notifying a user of said device of said incoming phone call irrespective of the user's activity on said device.

2. The method according to claim 1, wherein the portable electronic device is a cellular phone.

3. The method according to claim 1, wherein the portable electronic device is a portable computer system.

4. The method according to claim 3, wherein the portable computer system is a palmtop computer.

5. The method according to claim 3, wherein the portable computer system is a laptop computer.

6. The method according to claim 1, wherein said background task receives said incoming phone call.

7. The method according to claim 6, wherein said background task notifies said graphical user interface of said incoming phone call.

8. The method according to claim 7, wherein said graphical user interface is updated and includes an image of a cell phone keypad and digitry.

9. The method according to claim 7, wherein said graphical user interface is blocked.

10. The method according to claim 7, wherein said graphical user interface is partially blocked, whereby said user may continue said activity or initiate a new activity on said device.

11. The method according to claim 1, wherein said graphical user interface offers an answering option to said user.

12. The method according to claim 11, wherein said answering option comprises an option to transfer incoming phone call to a different electronic device.

13. The method according to claim 1, wherein said incoming phone call includes video information.

14. The method according to claim 13, wherein said graphical user interface displays said video information.

15. The method according to claim 1, wherein the portable electronic device is a television system.

16. A computer-readable medium storing instructions for controlling a portable electronic device having an operating system, the instructions related to delivering a phone call to the electronic device, the instructions comprising:

a) monitoring for incoming phone calls by a background task interfacing directly with the telephony functionality of said device, said background task always active, said device's operating system including at least one graphical user interface;
b) detecting said incoming phone call by said background task;
c) notifying said operating system of said incoming phone call by said background task; and
d) said background task notifying a user of said device of said incoming phone call irrespective of the user's activity on said device.

* * * * *